(12) United States Patent
Wu et al.

(10) Patent No.: US 9,653,998 B2
(45) Date of Patent: May 16, 2017

(54) BOOST CONVERTER AND POWER CONTROLING METHOD THEREOF

(71) Applicant: ASUSTeK COMPUTER INC., Taipei (TW)

(72) Inventors: Yue-Han Wu, Taipei (TW); Yii-Lin Wu, Taipei (TW); Ming-Ting Tsai, Taipei (TW); Kuan-Yi Lee, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 57 days.

(21) Appl. No.: 14/714,344

(22) Filed: May 18, 2015

(65) Prior Publication Data

US 2015/0340951 A1 Nov. 26, 2015

(30) Foreign Application Priority Data

May 23, 2014 (TW) .............................. 103118117 A

(51) Int. Cl.
*H02M 3/158* (2006.01)
*H02M 1/32* (2007.01)
*H02M 3/156* (2006.01)

(52) U.S. Cl.
CPC ............. *H02M 3/158* (2013.01); *H02M 1/32* (2013.01); *H02M 2003/1566* (2013.01)

(58) Field of Classification Search
CPC .... H02M 1/32; H02M 1/34; H02M 2001/342; H02M 2001/344; H02M 3/156; H02M 3/158

See application file for complete search history.

(56) References Cited

U.S. PATENT DOCUMENTS

| 5,446,366 | A  | * | 8/1995 | Bassett ................... | H02M 1/34 323/222 |
| 6,271,651 | B1 | * | 8/2001 | Stratakos .............. | H02M 3/158 323/282 |
| 6,507,174 | B1 | * | 1/2003 | Qian ....................... | H02M 1/34 323/222 |
| 7,239,114 | B2 | * | 7/2007 | Durbaum .............. | H02M 3/158 323/224 |
| 7,579,814 | B2 | * | 8/2009 | Orr ........................ | H02M 3/155 323/225 |

(Continued)

FOREIGN PATENT DOCUMENTS

| CN | 102820782 A | 12/2012 |
| TW | 200903966 A | 1/2009 |
| TW | 201128920 A1 | 8/2011 |

*Primary Examiner* — Gary L Laxton
(74) *Attorney, Agent, or Firm* — CKC & Partners Co., Ltd.

(57) ABSTRACT

A boost converter and a power control method thereof. The boost converter includes an inductor, a first switch unit, a second switch unit, a discharging loop and a detecting circuit. The inductor is electrically connected to a power input end. The first switch unit is electrically connected between the inductor and ground. The second switch unit is electrically connected between the inductor and an output end. The discharging loop is connected with the inductor in parallel and includes a third switch unit. The detecting circuit is used to detect a discharging value of the inductor. When the discharging value exceeds a threshold value, the third switch unit is turned on, and the inductor releases energy via the discharging loop.

8 Claims, 3 Drawing Sheets

(56) References Cited

U.S. PATENT DOCUMENTS

| | | | |
|---|---|---|---|
| 7,652,457 B2* | 1/2010 | Xi | ........................ H02M 3/158 |
| | | | 323/282 |
| 7,977,926 B2 | 7/2011 | Williams | |
| 8,148,853 B2* | 4/2012 | Saligram | .................. H01H 9/42 |
| | | | 307/126 |

* cited by examiner

BOOST CONVERTER AND POWER CONTROLING METHOD THEREOF

CROSS-REFERENCE TO RELATED APPLICATION

This application claims the priority benefit of Taiwan application Ser. No. 103118117, filed on May 23 2014. The entirety of the above-mentioned patent application is hereby incorporated by reference herein and made a part of specification.

BACKGROUND OF THE INVENTION

Field of the Invention

The disclosure relates to a boost converter and, more particularly, to a boost converter of an electronic device.

Description of the Related Art

A boost converter is generally used to convert an electric potential which is widely used in various electronic devices.

Generally, when short-circuit is occurred in an output end of a boost converter, a protection mechanism is triggered, for example, a semiconductor switch is thus turned off. However, the short-circuit current might flow to the load via a parasitic diode of the semiinductor switch, which might damage the load.

Furthermore, when a boost converter is switched from a heavy load to a light load, the current still flows because of the remaining energy of an inductor. Although a protection mechanism is turned on, the current may flow to output capacitor via a parasitic diode of the semiconductor switch, which causes overdrift at the electric potential of the output end.

BRIEF SUMMARY OF THE INVENTION

A boost converter having a power input end, a power output end, a inductor, a first switch unit, a second switch unit, a pulse width modulation (PWM) circuit, a discharging loop, a detecting circuit and a logic circuit. The PWM circuit is used to control turn-on or turn-off of the first switch unit and the second switch unit. The inductor is coupled to the first switch unit and the second switch unit, the inductor selectively stores energy by controlling the power input end or releases energy to the output end according to the turn-on or turn-off of the first switch unit and the second switch unit. The discharging loop is connected with the inductor in parallel and includes a third switch unit. The detecting circuit is used to detect a discharging value of the inductor. When the discharging value exceeds a threshold value, the third switch unit is turned on, and the inductor releases energy via the discharging loop.

A power control method applied to the boost converter having an inductor and a discharging loop, the discharging loop connects with the inductor in parallel, and the inductor releases energy to an output end. The power control method includes steps of: detecting a discharging value of the inductor when the inductor releases energy and triggering the discharging circuit to release energy of the inductor via the discharging loop, when the discharging value exceeds a threshold value.

In conclusion, the boost converter disclosed here protects in issues of over-current and the potential drift effectively and directly. Thus, the boost converter significantly reduces the risk of damage of the output capacitance.

DETAILED DESCRIPTION OF THE EMBODIMENTS

The terms "connected" or "coupled" hereinafter means that a component is connected or coupled to another component directly or indirectly.

Figure 1:
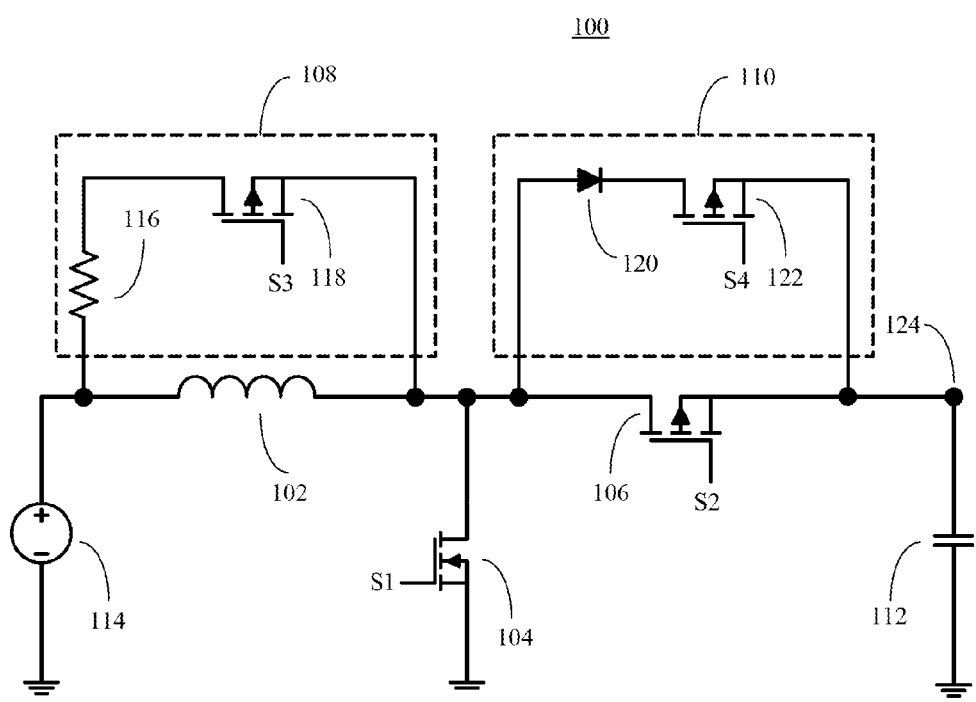
FIG. 1 is a circuit diagram showing a boost converter in an embodiment.

FIG. 1 is a circuit diagram showing a boost converter 100 in an embodiment. The boost converter 100 includes an inductor 102, a first switch unit 104, a second switch unit 106, a discharging loop 108, an auxiliary loop 110, an output capacitor 112 and a power input end 114. The discharging loop 108 includes an impedor 116 and a third switch unit 118. The auxiliary loop 110 includes a diode 120 and a fourth switch unit 122. A first end of the inductor 102 is electrically connected to the power input end 114, and a second end of the inductor 102 is electrically connected to the first switch unit 104, the second switch unit 106, and the auxiliary loop 110. The discharging loop 108 is connected with the inductor 102 in parallel. The second switch unit 106 is electrically connected to the output capacitor 112, and the auxiliary loop 110 is connected with the second switch unit 106 in parallel.

When the first switch unit 104 is turned on and the second switch unit 106 is turned off, the inductor 102 forms a circuit with the power input end 114 via the first switch unit 104, thus the energy supplied by the power input end 114 stored in the inductor 102. When the first switch unit 104 is turned off and the second switch unit 106 is turned on, the inductor 102 releases energy to the output capacitor 112 via the second switch unit 106.

A control end (such as a gate end) of the first switch unit 104 receives a first control signal S1 to control turn-on or turn-off of the first switch unit 104. A first end (such as a drain end) of the first switch unit 104 is electrically connected to a second end of the inductor 102, and a second end (such as a source end) of the first switch unit 104 is electrically connected to the ground.

On the other hand, a control end (such as a gate end) of the second switch unit 106 receives a second control signal S2 to control turn-on or turn-off of the second switch unit 106. A first end (such as a drain end) of the second switch unit 106 is electrically connected to a second end of the inductor 102, and a second end (such as a source end) of the second switch unit 106 is electrically connected to the output capacitor 112.

In the discharging loop 108, the impedor 116 (such as a resistor) is connected to the third switch unit 118 in series. Furthermore, a first end of the impedor 116 is electrically connected to the first end of the inductor 102, and a second end of the impedor 116 is electrically connected to the first end of the third switch unit 118. The second end of the third switch unit 118 is electrically connected to the second end of the inductor 102, and a control end of the third switch unit 118 is used to receive the third control signal S3.

When the discharging value a threshold value, for example, when the current flowing through the second switch unit 106 exceeds a threshold current, or when the potential of the output end 124 exceeds a threshold voltage, the first control signal S1 and the second control signal S2 are disable signal, and thus the first switch unit 104 and the second switch unit 106 are turned off.

At this moment, if there is no discharging path to release the energy stored in the inductor 102, the first end potential of the first switch unit 104 is too high, and the damage risk of the first switch unit 104 is increased. Thus, the third switch unit 118 in the discharging loop 108 is turned on via the third control signal S3, the electronic energy of the inductor 102 can be consumed by the impedor 116 of the discharging loop 108.

In some embodiments, the discharging loop 108 may only include the third switch unit 118 (such as a transistor), and it does not need the impedor 116. Furthermore, the third switch unit 118 of the discharging loop 108 can operate at an ohmic region (which means the third switch unit 118 can be regarded as an equivalent resistance), and the electronic energy of the inductor 102 is released via the third switch unit 118. Thus, the discharging loop 108 does not need the impedor 116 to release the electronic energy of the inductor 102.

In the auxiliary loop 110, the positive end of the diode 120 is electrically connected to the first end of the second switch unit 106. The negative end of the diode 120 is electrically connected to the first end of the fourth switch unit 122. The second end of the fourth switch unit 122 is electrically connected to the second end of the switch unit 106. The control end of the fourth switch unit 122 receives the fourth control signal S4.

In operation, when the discharging value does not exceed the threshold value (for example, the current flowing through the second switch unit 106 does not exceed the threshold current, or the potential of the output end 124 does not exceed the threshold voltage), the third switch unit 118 is turned off and the fourth switch unit 122 is turned on. On the other hand, when the discharging value exceeds the threshold value, the third switch unit 118 is turned on and the fourth switch unit 122 is turned off.

The auxiliary loop 110 is used as an auxiliary discharging path before the conduction of the discharging loop 108. During the transient period of the discharging value exceeding the threshold value, which means when the discharging value exceeds the threshold value, the third switch unit 118 needs adequate reacting time (the reacting time includes the determining time of detecting the discharging value, the signal generating time of generating the corresponding third control signal S3 to turn on the third switch unit 118 and the switching time of the switch unit affected by a slew rate of the third switch unit 118), and switches states from turn-off to turn-on. Before the turn-on of the third switch unit 118, the first switch unit 104 and the second switch unit 106 are turned off. In the embodiment, the fourth switch unit 122 maintains turn-on state, the inductor 102 generates the discharging current and releases the energy to the output end 124 via the diode 120 and the fourth switch unit 122. After the third switch unit 118 is turned on, the fourth switch unit 122 is turned off.

Furthermore, when the current flowing through the second switch unit 106 exceeds the threshold current, or when the potential of the output end 124 exceeds the threshold voltage (over-deviation), the first switch unit 104 and the second switch unit 106 are turned off by the first control signal S1 and the second control signal S2 respectively, and the third switch unit 118 is turned on by the third control signal S3 to trigger the discharging loop 108.

In some embodiments, there is a time delay between the time point of the third control signal S3 turning to enabling potential and the time point of the first control signal S1 and the second control signal S2 tuning to disabling potential. In the time delay, high potential may be generated at the first end of the first switch unit 104 by the electronic energy of the inductor 102, and thus the first switch unit 104 is damaged.

Therefore, in the time delay between the third control signal S3 and the first control signal S1 (or the second control signal S2), the fourth switch unit 122 of the auxiliary loop 110 maintains turn-on state, and the electronic energy of the inductor 102 can transitorily be released via the auxiliary discharging path (which is formed by the diode 120 and the fourth switch unit 122) provided by the auxiliary loop 110.

When the third control signal S3 turns to enabling signal, the fourth control signal S4 turns to a disabling signal to turn off the fourth switch unit 122, and then the electronic energy of the inductor 102 is released via the discharging loop 108.

Moreover, in the normal operation of the boost converter 100, the diode 120 blocks an output signal back flowing from the output end 124 when the second switch unit 106 is turned off and the fourth switch unit 122 is turned on.

In some embodiments, the order of the diode 120 and the fourth switch unit 122 in the series connection is not limited. Moreover, the first end of the fourth switch unit 122 is electrically connected to the first end of the second switch unit 106, the second end of the fourth switch unit 122 is electrically connected to the positive end of the diode 120, and the negative end of diode 120 is electrically connected to the second end of the second switch unit 106.

Figure 2:
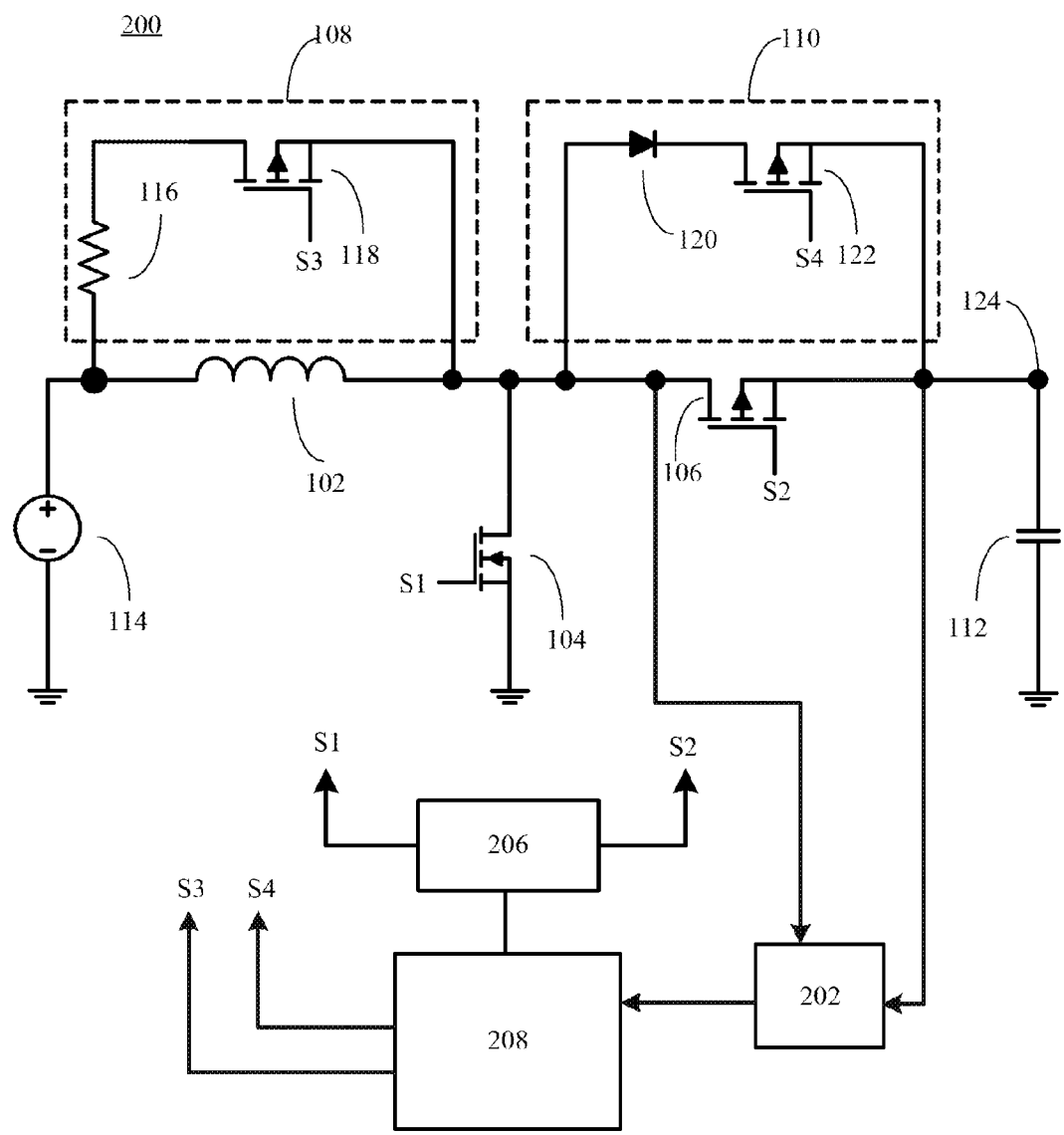
FIG. 2 is a schematic diagram showing a boost converter in an embodiment.

FIG. 2 is a schematic diagram showing a boost converter 200 in an embodiment. Compared with the boost converter 100 in FIG. 1, the boost converter 200 in FIG. 2 further includes a detecting circuit 202, a PWM circuit 206 and a logic circuit 208. The detecting circuit 202 and the PWM circuit 206 are electrically connected to the logic circuit 208 respectively.

In the embodiment, the detecting circuit 202 may be a current detecting circuit or a voltage detecting circuit. The detecting circuit 202 detects the discharging value (such as discharging current or a discharging voltage) when the inductor 102 releases energy to the output end (and the output capacitor 112 at the output end 124).

In an embodiment, the detecting circuit 202 includes a current detecting circuit to detect the discharging current flowing from the inductor to the output end 124. On the other hand, the detecting circuit 202 also includes a potential detecting circuit electrically connected to the output end 124, and the potential detecting circuit detects a discharging voltage at the output end 124.

The PWM circuit 206 is electrically connected to the control end of the first switch unit 104 and the control end of the second switch unit 106, and the PWM circuit 206 outputs the first control signal S1 and the second control signal S2 to control the first switch unit 104 and the second switch unit 106 to turn on or turn off.

The logic circuit 208 is electrically connected to the control end of the third switch unit 118. The logic circuit 208 controls the PWM circuit 206 and outputs the third control signal S3 and the fourth control signal S4.

When the discharging value does not exceed the threshold value, the first switch unit 104 and the second switch unit 106 are mutually turned on. For example, when the first switch unit 104 is turned on and the second switch unit 106 is turned off, a circuit is formed via the power input end 114 and the first switch unit 104, and energy is stored to the inductor 102 via the power input end 114.

When the first switch unit 104 is turned off and the second switch unit 106 is turned on, and the energy of the inductor 102 is released to the output end 124 (and the output capacitor 112 at the output end 124) via the second switch unit 106.

When the detecting circuit 202 detects that the discharging value (the discharging current or the discharging voltage) exceeds the threshold value, the logic circuit 208 informs the PWM circuit 206 to adjust the first control signal S1 and the second control signal S2 to the disabling signal, and thus the first switch unit 104 and the second switch unit 106 are turned off.

Moreover, the logic circuit 208 adjusts the third control signal S3 to enabling signal to turn on the third switch unit 118. The logical circuit 208 also adjusts the fourth control signal S4 to disabling signal to turn off the fourth switch unit 122. Thus, the energy of the inductor 102 is released via the discharging loop 108, which avoids the damage of the first switch unit 104 and the devices connected to the output end 124.

In some embodiment, in the time delay between the third control signal S3 and the first control signal S1 (or the second control signal S2), the logic circuit 208 maintains the third control signal S3 at disabling signal and turns on the fourth switch unit 122 of the auxiliary loop 110, which makes the electronic energy of the inductor 102 transitorily released inductor via the auxiliary discharging path provided by the auxiliary loop 110.

When the logic circuit 208 turns the third control signal S3 to the enabling signal, the logic circuit 208 turns the fourth control signal S4 to the disabling signal and switches the fourth switch unit 122 off, and then the electronic energy of the inductor 102 can be released via the discharging loop 108.

In some embodiments, the logic circuit 208 includes a PWM circuit 206.

Figure 3:
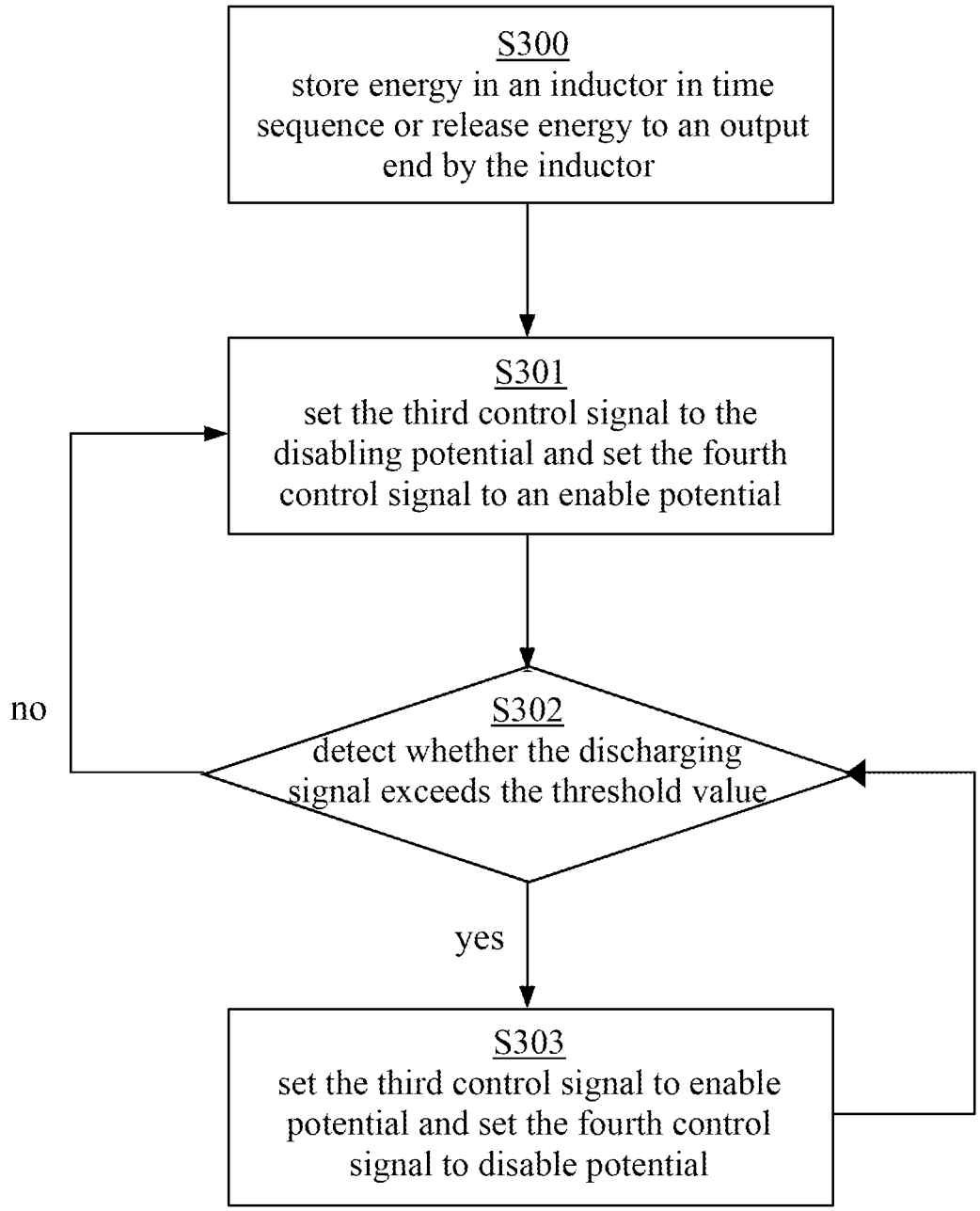
FIG. 3 is a flow chart schematic diagram showing a power control method of the boost converter in an embodiment.

In order to illustrate the power control method 300 of the boost converter 200 clearly, FIG. 3 is provided. FIG. 3 is a flow chart schematic diagram showing a power control method of the boost converter 200 in an embodiment.

When the boost converter 200 is initially started in the power control method 300, the first switch unit 104 or the second switch unit 106 is turned on according to the time sequence in step S300, and the energy is stored in the inductor or is released to an output end by the inductor. Further details can be referred to the embodiments in FIG. 1 and FIG. 2.

In a step S301, the logic circuit 208 sets the third control signal S3 to the disabling signal to turn off the third switch unit 118, and sets the fourth control signal S4 to the enabling signal to turn on the fourth switch unit 122.

In a step S302, the detecting circuit 202 detects whether the discharging value of the detective inductor 102 exceeds the threshold value. For example, the detecting circuit 202 detects whether discharge occurs overcurrent or potential drift. When the overcurrent and the potential drift do not occur, the step S302 is executed again, and the detecting circuit 202 continually detects the discharging value of the inductor 102. When discharge occur overcurrent or potential drift, a step S303 is executed.

In the step S303, the logic circuit 208 controls the PWM circuit 206 to make the first control signal S1 and the second control signal S2 to be the disabling signal, and the first switch unit 104 and second switch unit 106 are turned off. The logic circuit 208 outputs a third control signal S3 which is the enabling signal to turn on the third switch unit 118. The logic circuit 208 also outputs a fourth control signal S4 which is the disabling signal to turn off the fourth switch unit 122 to make the electronic energy of the inductor 102 release via the discharging loop 108.

In all the previous embodiments, the first switch unit 104, the second switch unit 106, the third switch unit 118 and the fourth switch unit 122 may be a metal-oxide semiconductor (MOS), a bipolar junction transistor (BJT) or other electronic switch units.

For example, the first switch unit 104 is an N-type MOS, and the second switch unit 106, the third switch unit 118 and the fourth switch unit 122 are P-type MOS. In some embodiments, the first switch unit 104, the second switch unit 106, the third switch unit 118 and the fourth switch unit 122 may be transistors of different types (such as an N-type MOS or a P-type MOS).

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A boost converter including a power input end and an output end, comprising:
   a first switch unit;
   a second switch unit;
   a pulse width modulation (PWM) circuit for controlling the first switch unit and the second switch unit to turn-on or turn-off,
   an inductor coupled to the first switch unit and the second switch unit, wherein the inductor is controlled by switch-states of the first switch unit and the second switch unit, to store energy received from the power input end or to release energy stored in the inductor to the output end selectively;
   a discharging loop connected with the inductor in parallel and including a third switch unit;
   an auxiliary loop connected in parallel with the second switch unit, and the auxiliary loop including a diode and a fourth switch unit, the diode and the fourth switch unit being connected in series;
   a detecting circuit for detecting a discharging value of the inductor; and
   a logic circuit coupled to the detecting circuit and the fourth switch unit, wherein when the discharging value is less than the threshold value, the logic circuit turns off the third switch unit and turns on the fourth switch unit, and when the discharging value is larger then the threshold value, the logic circuit turns on the third switch unit and turns off the fourth switch unit.

2. The boost converter according to claim 1, wherein the discharging loop further includes an impedor electrically connected to the third switch unit in series, when the discharging value exceeds the threshold value, the first switch unit and the second switch unit are turned off, the third switch unit is turned on, and the inductor releases energy via the impedor of the discharging loop.

3. The boost converter according to claim 1, wherein the detecting circuit includes a current detector or a voltage detector to detect whether discharging current of the inductor or a discharging voltage at the output end exceeds the threshold value.

4. The boost converter according to claim 1, wherein during a transient period when the discharging value exceeds the threshold value and when the third switch unit is turned off, the fourth switch unit maintains in turn-on, and the inductor is released to the output end via the diode and the fourth switch unit until the third switch unit is turned on, and then the fourth switch unit is turned off.

5. A power control method, suitable for a boost converter, wherein the boost converter includes an inductor, a discharging loop, a first switch unit, a second switch unit and an auxiliary loop, the discharging loop connected in parallel with the inductor, and the auxiliary loop is electrically connected in parallel with the second switch unit, the method comprising following steps:

detecting a discharging value of the inductor when the inductor releases energy; and turning off the auxiliary loop and turning on the discharging loop when the discharging value is larger than the threshold value.

6. The power control method according to claim 5, wherein the discharging loop further includes an impedor, and when the discharging value exceeds the threshold value, the inductor releases the energy via the impedor of the discharging loop.

7. The power control method according to claim 5, wherein the step of detecting the discharging value of the inductor when the inductor releases energy further includes:

detecting discharging current of the inductor; and determining whether the discharging current exceeds the threshold value.

8. The power control method according to claim 5, wherein the discharging loop includes an impedor and a third switch unit, the third switch unit connected in series with the impedor, and the auxiliary loop includes a fourth switch unit and a diode, the fourth switch unit is connected in series with the diode during a transient period when the discharging signal exceeds the threshold value, the third switch unit is turned off, the fourth switch unit maintains turn-on, the energy of the inductor is released to the output end via the diode and the fourth switch unit; and after the third switch is turned on, the fourth switch unit is turned off.

* * * * *